United States Patent

[11] 3,624,166

| [72] | Inventors | Robert Fuhrmann<br>Morris Plains;<br>John Pisanchyn, Morristown; Fred William<br>Koff, Clifton, all of N.J. |
|---|---|---|
| [21] | Appl. No. | 772,838 |
| [22] | Filed | Nov. 1, 1968 |
| [45] | Patented | Nov. 30, 1971 |
| [73] | Assignee | Allied Chemical Corporation<br>New York, N.Y. |

[54] PROCESS FOR THE SOLVENT EXTRACTION OF HALOALKANES
11 Claims, No Drawings

[52] U.S. Cl. .................................................. 260/652 P,
260/648 R, 260/653
[51] Int. Cl. ...................................................... C07c 17/38
[50] Field of Search ............................................ 260/648,
648 P, 658 P, 653; 23/312

[56] References Cited
UNITED STATES PATENTS
2,357,028  8/1944  Shiras et al. .................. 260/652 P
OTHER REFERENCES
Weissberger, Technique of Organic Chemistry, Interscience Publishers, New York, Vol. IV (1951) page 338 QD251W44

*Primary Examiner*—Howard T. Mars
*Attorneys*—Arthur J. Plantamura and Herbert G. Burkard

ABSTRACT: This invention relates to an improved method of separating haloalkanes from alkanes or other haloalkanes of lower halogen to carbon ratio by extraction with dialkyl sulfoxides, cyclic lactams or nitroparaffins. The haloalkanes of interest are fluoroalkanes, chloroalkanes, and bromoalkanes.

PROCESS FOR THE SOLVENT EXTRACTION OF HALOALKANES

BACKGROUND OF THE INVENTION

The separation from each other of the components of a mixture of haloalkanes and alkanes may be readily accomplished by use of the solvent extraction process of the instant invention. This process is particularly useful where some of the components to be separated from each other have boiling points which are so close to each other as to make them difficult to separate by ordinary distillation methods.

A solvent extraction process is defined as one in which the separation of different components of a mixture is accomplished by contacting the mixture with a selective liquid solvent, hereinafter referred to as the extraction solvent.

Although a solvent may dissolve a particular compound, it is not necessarily a good solvent for selectively extracting that compound from a mixture. A good extraction solvent must dissolve a particular compound from a mixture preferentially to the other components of the mixture. Also, at least one of the other components of the mixture must be immiscible or only partly miscible with the extraction solvent so that two phases are formed, thus allowing phase separation. Hereinafter the preferentially dissolved compound is called the "solute" and the two phases which form are called the "extract phase" and the "raffinate phase."

Ideally the extract phase should contain essentially extraction solvent and solute, and the raffinate phase should contain essentially the nonpreferred components. However, in actual practice, such a sharp separation is very unlikely, especially after only one contacting step, for no matter how specific an extraction solvent may be for a particular component of a mixture, it will inevitably extract a certain amount of the other components of the mixture. Therefore, the extract phase will usually contain some of the nonpreferred components of the mixture. Also, the raffinate phase will usually contain some extraction solvent and an amount of unextracted solute.

SUMMARY OF THE INVENTION

It is an object of the present invention to provide a method of extracting haloalkanes from alkanes.

It is a further object of the present invention to provide a method of extracting certain haloalkanes from other haloalkanes having a lower halogen to carbon ratio.

It is a still further object of the invention to provide a method of extracting certain chloroalkanes from a mixture of alkanes and other chloroalkanes of lower chlorine to carbon ratio. Further objects will become apparent from the description of the invention which follows in greater detail.

It has now been found in accordance with this invention that haloalkanes can be extracted from alkanes or from other haloalkanes having a lower halogen to carbon ratio than the extracted haloalkane by contacting a mixture of these compounds with an extraction solvent selected from the group consisting of dialkyl sulfoxides, cyclic lactams and nitroalkanes.

As used herein and in the appended claims, the term "haloalkane" refers to fluoroalkanes, bromoalkanes, or chloroalkanes.

The remainder of this specification will discuss the extraction method of the present invention in terms of mixtures containing haloalkanes of the same halogen species, i.e. the haloalkanes are either all floralkanes, all bromoalkanes, or all chloroalkanes. It should be noted, however, that the solvents of the instant invention can also be used to extract haloalkanes from mixtures of two or of all three of the haloalkane species. In this situation, the haloalkanes which are preferentially extracted are not determined solely by halogen to carbon ratio, but also be relative affinity of the solvent for each of the three species of haloalkane.

Dialkyl sulfoxides useful as extraction solvents in the process of the instant invention have the formula:

wherein $R_1$ and $R_2$ are independently selected alkyl groups having from one to five carbon atoms each. The alkyl groups can be normal or branched chain alkyl groups. $R_1$ and $R_2$ can also form part of a heterocyclic ring having at least four carbon atoms in the ring and having a total of four to 10 carbon atoms in the compound, such alicyclic sulfoxides having the formula.

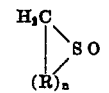

wherein $n$ is three to nine and R is a divalent alkyl group of up to seven carbon atoms, each R being independently selected so that said sulfoxide has a total of from four to 10 carbon atoms. Suitable sulfoxides include dimethyl sulfoxide, diethyl sulfoxide, methylethyl sulfoxide, methylpentyl sulfoxide, methylisobutyl sulfoxide and cyclohexyl sulfoxide.

Cyclic lactams useful as extraction solvents in the process of the instant invention have the formula:

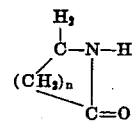

wherein "$n$" is an integer from 2 to 5. Also useful are the monomethyl derivatives of the above cyclic lactams wherein the methyl is substituted for one of the hydrogens attached to a carbon or to the nitrogen. Suitable cyclic lactams and their monomethyl derivatives include 2-pyrrolidone, valerolactam, N-methyl pyrrolidone, caprolactam and N-methyl caprolactam.

Nitroalkanes suitable as extraction solvents in the process of the instant invention are nitromethane, $CH_3NO_2$ and nitroethane, $C_2H_5NO_2$.

The mixture to be fractionated can contain straight chain, branched chain and cyclic alkanes and their halogen derivatives. The haloalkanes can be mono- or poly halogenated and can contain primary, secondary, or tertiary halogen atoms. The halogen groups can be either fluorine, bromine or chlorine. The preferred ratio of halogen atoms to carbon atoms in the haloalkane to be extracted is from about 1:10 to about 4:1.

In general, the greater the halogen to carbon ratio of a haloalkane, the greater the affinity of the extraction solvent for that haloalkane over a less halogenated alkane in the mixture. Therefore, for example, on contacting a mixture of dichlorooctane and monochlorooctane with one of the extraction solvents of the instant invention, the extract phase will contain essentially dichlorooctane, i.e., the compound with the higher chlorine to carbon ratio.

An extraction process usually comprises three steps, as follows:

1. Bringing the mixture to be fractionated into intimate contact with the liquid extraction solvent.

2. Separating the resultant phases, i.e., the resultant layers or streams.

3. Removing and recovering the solvent from each of the phases for reuse.

These operations are explained in greater detail below.

The mixture to be fractionated and the extraction solvent are intimately contacted for a period of time which is dependent upon the amount of interphase contact achieved. The better the contact, the shorter the contact time required. Generally from about 5 seconds to 5 minutes per contact step is sufficient. Good interphase contact can be obtained by any of the conventional methods known to those skilled in the chemical engineering art, such as agitation, stirring, shaking and countercurrent flow through a packed column. The ratio of solvent to mixture will depend on the efficiency of the solvent for a given separation and on the degree of separation desired. The volume ratio of solvent to mixture can vary from about 0.20/1 to about 20/1 per contact step, preferably from about 0.25/1 to about 5/1 per contact step.

The temperature during the contacting operation can vary from about 20° C. up to the solubilization temperature, i.e. that temperature at which the extraction solvent forms a single phase with the mixture. The solubilization temperature depends on the mixture to be separated and on the particular extraction solvent employed. A contact temperature below the boiling point of the extraction solvent or any of the major components of the mixture will allow the process to be conducted at atmospheric pressure, however, the process is operable at pressures above atmospheric. In general, the higher the contact temperature, up to the solubilization temperature, the greater the amount of haloalkanes extracted per unit volume of extraction solvent.

An extraction stage consists of the contacting and separation steps. The process of the instant invention may consist of a single extraction stage or a series of stages wherein the feed and solvent streams flow either concurrent or countercurrent to each other. Further, the extraction stage may be one in which the two phases are equilibrated before being separated and sent to the next state, such as in a mixer-settler, or one in which the contacting streams never actually reach equilibrium before going to the next stage, such as occurs in a perforated plate column.

Various types of equipment to perform the above operations are known to those skilled in the chemical engineering art and include mixer-settlers, spray columns, perforated plate columns, packed columns and centrifugal type extractors such as the Podbielniak extractor.

The removal and recovery of the extraction solvent from the extract phase may be accomplished by any of several conventional methods or combinations thereof, such as:
a. distillation
b. evaporation
c. cooling of the extract phase to decrease the solubility of the extracted haloalkane in the extraction solvent to the point that two phases form, then separating the two phases
d. contacting the extract phase with a solvent which is immiscible with the extraction solvent but which dissolves the extracted haloalkane, then separating the two phases which form
e. contacting the extract phase with a solvent which is miscible with the extraction solvent but is immiscible with the extracted haloalkane, then separating the two phases which form.

The above methods may also be used to remove and recover any extraction solvent present in the raffinate phase. The recovered solvent may then be reused in the extraction process.

The extraction process of the instant invention is particularly useful in the manufacture of detergents, wherein a mixture of $C_{12}$ to $C_{15}$ alkanes is chlorinated and the resultant chloroalkanes are then reacted with benzene to produce alkylbenzenes. It is desirable to first separate out any polychloroalkanes because the reaction of benezene with polychloroalkanes produces compounds which have a detrimental effect of the later formed detergents. Such a separation is usually impractical by conventional fractionation methods because of the similar or overlapping boiling points of the reaction products. However, by use of an extraction solvent in accordance with the instant invention, the polychloroalkanes can readily be separated from the alkanes and monochloroalkanes of the chlorination product.

The invention can be more fully understood by reference to the following examples. The extraction apparatus used in these examples consists of a jacketed 3-neck round bottom flask with a stopcock at the bottom for draining the flask. Inserted in the center neck is a Teflon-bladed, motor-driven stirrer. There is a condenser with a nitrogen bypass in one side neck and a thermometer in the other side neck. Temperature is maintained at the desired level by circulating heated silicone oil through the extractor jacket.

EXAMPLE 1

Treatment of Alkane-Chloroalkane Solutions with Dimethyl Sulfoxide Extraction Solvent Various 500 ml. solutions, chosen from the alkane-chloroalkane combinations listed in table I below were charged to the extraction apparatus. Then 500 ml. (548 grams) of dimethyl sulfoxide was added and the temperature brought up to the desired level and held there for 30 minutes. All during this time the mixture was vigorously stirred. The stirring was then terminated and the mixture allowed to stand undisturbed for 30 minutes to allow phase separation to occur, while maintaining the temperature constant. Following the phase separation, the bottom layer (dimethyl sulfoxide layer) was removed. For some solutions a second extraction was then made by the addition to the remaining solution of an equal volume of dimethyl sulfoxide.

The solution remaining in the apparatus after the final extraction was analyzed for chloroalkane content by gas-liquid chromatography.

The compositions of the various alkane-chloroalkane solutions and the results of the extraction are given below in table I.

EXAMPLE 2

Treatment of Dodecane Chlorination Product with Various Extraction Solvents

Four hundred milliliters samples of dodecane chlorination product were charged to the extraction apparatus. Each sample contained monochlorododecanes, dichlorododecanes, and unreacted dodecanes. The 400 ml. of an extraction solvent was added to each sample. The extraction solvents used are listed below in table II. The mixture was brought up to temperature and held there for 30 minutes while being vigorously stirred. The stirring was terminated and the mixture allowed to stand undisturbed for another 30 minutes at the same temperature. Two layers formed and the bottom one

TABLE I.—EXTRACTION WITH DIMETHYL SULFOXIDE

| Charge solution [1] | A | B | C | D | D | E |
|---|---|---|---|---|---|---|
| Weight of charge solution, grams | 405 | 394 | 388 | 360 | 360 | 386 |
| Weight of chloroalkane in solution, grams | 68.17 | 55.75 | 51.28 | 42.93 | 43.23 | 49.77 |
| Extraction temperature, ° C | 110 | 110 | 110 | 81 | 110 | 110 |
| Number of extraction steps | 1 | 1 | 1 | 2 | 2 | 2 |
| Chloroalkane extracted, grams: | | | | | | |
| 1st extraction | 57.17 | 42.72 | 28.08 | 7.75 | 9.65 | 20.74 |
| 2d extraction | | | | 6.83 | 8.85 | 12.28 |
| Total | 57.17 | 42.72 | 28.08 | 14.58 | 18.50 | 33.02 |
| Total chloroalkane extracted, weight, percent | 83.8 | 76.7 | 54.7 | 33.9 | 43.5 | 66.4 |

[1] Composition of charge solutions.—A=1,2,3-trichloropropane/dodecane; B=1,4-dichlorobutane/dodecane; C=1,8-dichlorooctane/dodecane; D=2-chlorooctane/octane; E=chlorocyclohexane/dodecane.

TABLE II.—TREATMENT OF DODECANE CHLORINATION PRODUCT

| Extraction solvent used | Dimethyl sulfoxide | 2-pyr-rolidone | Nitro methane |
|---|---|---|---|
| Weight of 400 ml. of solvent, grams | 438 | 411 | 450 |
| Weight of charge solution, grams | 311 | 311 | 311 |
| Monochlorododecanes in charge solution, grams | 56.1 | 56.1 | 49.0 |
| Dichlorododecanes in charge solution, grams | 22.7 | 22.7 | 18.8 |
| Extraction temperature, °C | 110 | 110 | 95 |
| Number of extractions | 2 | 2 | 1 |
| Total monochlorododecanes extracted: | | | |
| Grams | 14.1 | 15.4 | 12.1 |
| Weight percent | 25.0 | 27.4 | 24.7 |
| Total dichlorododecanes extracted: | | | |
| Grams | 11.3 | 9.2 | 8.5 |
| Weight percent | 49.6 | 40.5 | 45.1 |

(the extraction solvent layer) was removed from the apparatus. For some solutions a second extraction was made by adding another 400 ml. of extraction solvent to the solution remaining in the apparatus, and then repeating the procedure of the first extraction.

The solution remaining in the apparatus, after the final extraction, was analyzed for chloroalkane content by gas-liquid chromatography.

EXAMPLE 3

Treatment of Alkane-Chloroalkane Solution with Nitromethane Extraction Solvent

A 200 ml. solution containing 1,4-dichlorobutane and dodecane was charged to the extraction apparatus and 200 ml. (226 grams) nitromethane were added. The extraction procedure that followed was the same as that described in example 1, with only one extraction step being performed. Conditions and results are listed below in table III. Note that although some dodecane was coextracted with the dichlorobutane, the ratio of dichlorobutane to dodecane in the extract layer is almost eight times what it was in the charge solution. The extract layer can serve as feed for another extraction stage so as to yield a new extract layer even further enriched in dichlorobutane.

TABLE III

| | |
|---|---|
| Weight of charge solution, grams | 154.0 |
| 1,4-dichlorobutane in solution, grams | 11.4 |
| Dodecane in solution, grams | 142.6 |
| Weight ratio, 1,4-dichlorobutene/dodecane in charge solution | 0.08/1 |
| Extraction temperature | 95 |
| 1,4-dichlorobutane extracted by nitromethane, grams | 10.85 |
| 1,4-dichlorobutane extracted, % of charge | 95.5 |
| Dodecane extracted by nitromethane, grams | 17.9 |
| Dodecane extracted, % of charge | 7.6 |
| Weight ratio, 1,4-dichlorobutane/dodecane in nitromethane layer | 0.61/1 |

EXAMPLE 4

Treatment of a Mono- and Dichlorododecane Mixture with Dimethyl Sulfoxide Extraction Solvent A 65 ml. solution containing mono- and dichlorodecane free of dodecanes was charged to the extraction apparatus and 65 ml. (71.2 grams) of dimethyl sulfoxide were added. The extraction procedure that followed was the same as that described in example 1 with two extraction steps being performed. The charge solution and the results of the extraction are described below in table IV.

TABLE IV

| | |
|---|---|
| Weight of charge solution, grams | 57.93 |
| Monochlorododecanes in solution, grams | 37.25 |
| Dichlorododecanes in solution, grams | 20.68 |
| Extraction temperature, °C. | 45 |
| Total dichlorododecanes extracted | |
| Grams | 9.31 |
| Weight percent | 45.0 |

EXAMPLE 5

Solvent Extraction of a Bromocyclohexane/Dodecane Solution with Nitromethane Solvent A 200 ml. solution containing bromocyclohexane and dodecane was charged to the extraction apparatus and 200 ml. (225.3 grams) of nitromethane were added. The extraction procedure that followed was the same as that described in example 1 with only one extraction step being performed. The charge solution and the results of the extraction are described below in table V.

TABLE V

| | |
|---|---|
| Weight of charge solution, grams | 151.5 |
| Bromocyclohexane in solution, grams | 16.51 |
| Extraction temperature, °C. | 90 |
| Number of extractions | 1 |
| Bromocyclohexane extracted | |
| Grams | 6.08 |
| Weight percent | 36.8 |

EXAMPLE 6

Repeating the procedures of examples 1 through 5 with the substitution of the corresponding fluoroalkanes for the various chloro- or bromoalkanes of each example will yield substantially similar results.

Various modifications will be apparent to those skilled in the art and it is not intended that this invention be limited to the details in the specific examples presented by way of illustration. Accordingly, the scope of the invention is limited only by the appended claims.

We claim:

1. A method for extracting haloalkanes selected from the group consisting of fluoroalkanes, bromoalkanes, and chloroalkanes from a mixture comprising said haloalkanes and at least one compound selected from the group of compounds consisting of alkanes and haloalkanes of the same halogen species as, and of a lower halogen to carbon ratio than, the haloalkane being extracted, said extraction method comprising:

a. contacting said mixture with an extraction solvent selected from the group consisting of dialkyl sulfoxides of two to 10 carbon atoms at a temperature ranging from about 20° C. up to the temperature at which the extraction solvent forms a single phase with the mixture, so as to form a raffinate and an extract phase, wherein the volume ratio of solvent to mixture varies from about 0.2 to 1 up to about 20 to 1.

b. separating said extract phase containing said extraction solvent and at least a portion of the haloalkanes of the higher halogen to carbon ratio present in said mixture from said raffinate phase.

2. The method of claim 1, wherein the halogen to carbon ratio of the extracted haloalkane is from about 1.10 to about 4:1.

3. The method of claim 1, wherein said haloalkanes are bromoalkanes.

4. The method of claim 1, wherein said haloalkanes are chloroalkanes.

5. The method of claim 1, wherein the separated extract phase is distilled to separate the extraction solvent from the extracted haloalkane.

6. The method of claim 1, wherein said mixture consists essentially of alkanes and haloalkanes having from about 12 to about 15 carbon atoms.

7. The method of claim 1 wherein said extraction solvent is a dialkyl sulfoxide of the formula:

wherein $R_1$ and $R_2$ are independently selected alkyl groups of one to five carbon atoms.

8. The method of claim 9 wherein said dialkyl sulfoxide is dimethyl sulfoxide.

9. A method for extracting chloroalkanes having a chlorine to carbon ratio of from about 1:10 to about 4:1 from a mixture containing said chloroalkanes and at least one compound selected from the group of compounds consisting of alkanes and chloroalkanes of lower chlorine to carbon ratio than the extracted chloroalkanes, said extraction method comprising:

a. contacting said mixture with an extraction solvent selected from the group consisting of dialkyl sulfoxides of two to 10 carbon atoms so as to form a raffinate and an extract phase, said contacting being effected at a temperature ranging from about 20° C. up to the temperature at which the extraction solvent forms a single phase with the mixture; the volume ratio of extraction solvent to mixture ranging from about 0.2 to 1 up to about 20 to 1, b. separating said extract phase containing said extraction solvent and at least a portion of chloroalkanes having a chlorine to carbon ratio of from about 1:10 to about 4:1, from said raffinate phase.

10. The method of claim 9 wherein said mixture consists essentially of alkanes and chloroalkanes having from about 12 to about 15 carbon atoms.

11. The method of claim 9 wherein said extraction solvent is dimethyl sulfoxide.

* * * * *

PO-1050
(5/69)

UNITED STATES PATENT OFFICE
CERTIFICATE OF CORRECTION

Patent No. 3,624,166     Dated November 30, 1971

Inventor(s) Robert Fuhrmann, John Pisanchyn, Fred W. Koff

It is certified that error appears in the above-identified patent and that said Letters Patent are hereby corrected as shown below:

Claim 8, Column 7, Line 20, "claim 9" should be -- claim 7 --.

Signed and sealed this 6th day of June 1972.

(SEAL)
Attest:

EDWARD M. FLETCHER, JR.
Attesting Officer

ROBERT GOTTSCHALK
Commissioner of Patents